June 26, 1945. A. R. HEDBERG 2,379,003
DIE
Filed June 14, 1944
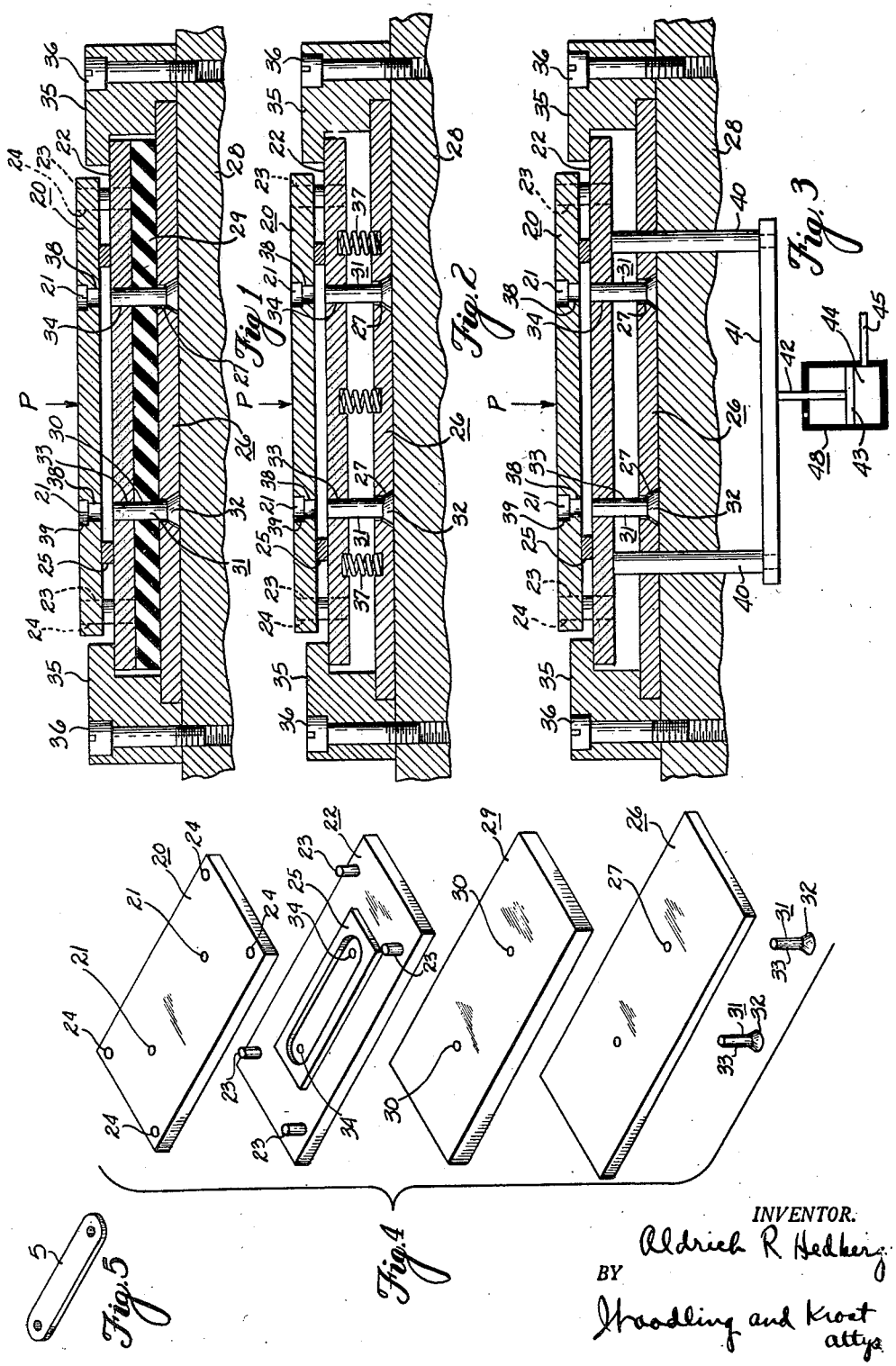

Patented June 26, 1945

2,379,003

UNITED STATES PATENT OFFICE 2,379,003

DIE

Aldrich R. Hedberg, Cleveland, Ohio, assignor of one-third to Melvin E. Lorentz and one-third to Kermit W. Peterson Application June 14, 1944, Serial No. 540,190

10 Claims. (Cl. 164—94)

My invention relates in general to die assemblies and more particularly to piercing and forming die assemblies.

An object of my invention is the provision of a pair of die plates to hold a work piece and carry the work piece down upon a punch or punches whereby piercing is done by axially stationarily mounted punches which are laterally full floating.

Another object of my invention is the provision of a piercing die assembly in which the die part is removably connected to the assembly and must be withdrawn from its working position for insertion of a work piece in the assembly.

Another object of my invention is to provide dies for small-lot jobs which may be assembled from stock die parts to produce a variety of resultant dies.

Another object of my invention is to provide dies for small-lot jobs which may be assembled from stock die parts which are relatively inexpensive to produce.

Another object of my invention is to provide a piercing die assembly which is self-aligning with respect to its die and punch parts.

Another object of my invention is to provide a piercing die assembly which does not require a holding jig to maintain its various parts in perfect alignment.

Another object of my invention is to provide a piercing die assembly which does not require specific types of power tools to actuate the moving parts thereof.

Another object of my invention is to provide a piercing die assembly in which the piercing punches are full floating, or in other words not tightly clamped in a jig, whereby punch breakage caused by loosening and consequent misalignment is eliminated.

Other objects and a better understanding of my invention may be had by referring to the following specification and claims in connection with the accompanying drawing, in which:

Figure 1 is a cross-sectional view of a piercing die assembly conforming to my invention in which cork, rubber, or other resilient material is used as the stripping actuating means;

Figure 2 is a cross-sectional view of a piercing die assembly conforming to my invention in which springs are used as the stripping actuating means;

Figure 3 is a cross-sectional view of a piercing die assembly in which a fluid means employing either a hydraulic or pneumatic system is used as the stripping actuating means;

Figure 4 is an expanded view of the type of piercing die assembly conforming to my invention as shown in Figure 1; and Figure 5 is a view of a work piece of the type to be punched by piercing die assembly of Figure 1.

With reference to Figure 1, I illustrate a die 20 with openings 21 therethrough. The reference character 22 indicates a stripper plate with openings 34 therein and with guide pins 23 fastened thereto, the guide pins 23 extending therefrom into openings 24 of the die 20. A nest part 25 is shown positioned between the die 20, and the stripper plate 22, for the purpose of positioning a work piece in the proper relationship to the openings 21. The nest part 25 is preferably a minute amount less thick than the work piece, in order that the work piece may be clamped between the die 20 and the stripper plate 22. However, the nest part 25 may actually be thicker than the work piece, in which case a work piece would not be actually clamped, but would float a little loosely during the punching action. A base plate 26 having chamfer openings 27 therethrough is shown resting on the bed plate 28 of a power device such as a punch press. A slab of cork, rubber, or other resilient material 29 is shown positioned between the stripper plate 22 and the base plate 26 of the piercing die assembly and is provided with openings 30 therethrough. Piercing punches 31 are illustrated with a tapered shoulder portion 32 and a straight shank or stem portion 33. In Figure 1, I illustrate the piercing punches 31 with their respective tapered shoulder portions 32 fitting in a chamfer opening 27 of the base plate 26, and each having their straight shank or stem portion 33 extending through an opening 30 of the resilient slab 29 and extending into an opening 34 of the stripper plate 22. The punches 31 are shown extending into the stripper plate 22 far enough that the ends of the punches are substantially flush with the face of the stripper plate 22. Clamps 35 are provided and have bolts 36 which may screw into the bed plate 28 as illustrated. The clamps 35 are used to hold the piercing die assembly in the proper location upon the bed of an actuating device such as a punch press, in which the assembly is used.

With reference to Figure 5, I illustrate a work piece 5 which may be processed with the particular arrangement of parts illustrated in Figure 4.

With reference to Figure 4, I illustrate the die 20 having four openings 24 therethrough to serve as guide channels in conjunction with the guide pins 23. Two die openings 21 are illustrated in this particular embodiment of my invention. The openings 21 may be provided with a cutting portion 38 and an enlarged portion 39 as illustrated in Figure 1. The cutting portion 38 of the openings 21 are dimensioned to fit closely upon the straight shank or stem portion 33 of the piercing punches 31 whereby shearing action can take place therebetween. The enlarged portion 39 of the openings 21 is provided to permit the release of any slug cut out by the punches 31 and pushed into the opening 21. The die 20 is best made of a high grade tempered steel.

The stripper plate 22 is shown provided with guide pins 23 extending from the face thereof. The pins 23 are disposed to enter the openings 24 of the die 20. Openings 34 of the stripper plate 22 are provided to allow the straight shank or stem portion 33 of the punches 31 to pass therethrough. The openings 34 are dimensioned to form a sliding and guiding fit with the shank or stem portion 33 of the punches 31.

The nest part 25, as shown in Figure 4, is provided to position a work piece 5 between the die 20 and the stripper plate 22 as desired. The nest 25 may be of several different forms, and is illustrated in Figure 4 as being a thin strip of material removably fastened to the stripper plate 22, and having an opening therein to receive the work piece.

The slab of cork, rubber or other resilient material 29 is provided in this particular embodiment of my invention to serve as stripping actuating means, and is shown provided with openings 30 through which the punches 31 may pass.

The base plate 26 is provided to anchor the punches 31 against axial movement, but is provided with lateral clearances for self-alignment freedom. The general form of the base plate 26 is shown in Figure 4, and a profile form of the openings 27 therethrough is shown in Figure 1. It is noted from Figure 1 that the openings 27 are considerably larger than straight shank or stem portion 33 of the punches 31, which condition permits the punches 31 to move somewhat laterally and align themselves with the openings 34 of the stripper 22 and the openings 21 of the die 20. By permitting the described lateral movement of the punches 31, the difficult problem of aligning three different points together is greatly simplified. When construction of parts for a particular form of my invention is carried out, only the die 20 and the stripper 22 need to be aligned. The provision of laterally movable punches 31 as described constitutes a full floating punch holding means giving freedom to punch alignment and the punches are to a large degree self-aligning. Self-alignment is a large factor in the prevention of punch breaking. The punches are free to adjust and align themselves to the openings in the die 20 and the stripper 22, thus preventing binding with consequent breakage of punches and dies, or both. It is noted, then, that the punches 31 are dependent upon the openings 34 of the stripper plate 22 for correct alignment with the cutting portion 38 of the openings 21 because of the described full-floating nature of the punches. Therefore, the stripper plate 22 serves also as a punch guiding means. This function is important because expensive jigs are not required to hold the punches 31 in perfect alignment with the openings 21 of the die 20. The punches 31 are flanged at one end to prohibit their passage through the opening 27 of the base plate 26.

It is a well known fact that with the use of standard type forming dies, the largest expense in small-lot jobs is the initial expense of providing special dies for the job. My invention provides a unique flexibility in piercing or forming die construction by the use of interchangeable parts. For example, the die 20 may be provided with a variety of openings 21 and the nest 25 may be moved about from place to place upon the stripper plate 22, or be entirely replaced by a new nest. It is readily understood therefore, that a great variety of different forming and piercing operations may be handled with a relatively few number of stock parts carried in reserve. The variety of openings 21 need not always be for the purpose of piercing. Suitably shaped openings and punches may be provided to make indentations or bends in a work piece if desired.

For use, after the correct selection of parts are assembled, the punches 31 are inserted through the holes 27 of the base plate 26 until the straight or stem shank portion 33 of the punches 31 contact the tapered part of the openings 27. The combination of base plates and punches may then be set on a flat surface, such as the bed plate 28 of the punch press. As can be seen in Figure 1, with the punches in the position as hereinbefore described, the punches are free to move laterally a small amount because of the clearance between the hole 27 and the straight shank or stem portion 33 of the punches 31. The punches 31 are constrained against substantial axial movement by the tapered surfaces of the punches 31 and the hole 27 coming into contact with each other. The stripping actuating means, in this particular case the slab of cork, rubber or other resilient material 29, is next placed down over the punches 31 with the straight stem portion 33 of the punches 31 extending through the openings 30 of the cork. By setting the die 20 down upon the stripper plate 22 with the guide pins 23 extending into the openings 24 of the die 20, a combination of die and stripper plate is obtained. The combination of die and stripper plate as hereinbefore described may then be placed upon the assembled combination of punches, base plate, and resilient slab, with the shank portion 33 of the punches 31 extending into the openings 34 of the stripper plate 22. The resilient slab 29 should be just thick enough to allow the punches 31 to extend almost flush with the inner surface of the stripper plate 22.

In operation, my piercing die assembly employs a new and unique principle of stationary punches in conjunction with a movable stripper plate and die. A work piece is inserted into the nest 25 after the die 20 is first removed from the stripper plate 22. The die 20 is then re-positioned upon the stripper plate 22 with the pins 23 extending into the openings 24 thereof. With the arrangement hereinbefore described, the assembly appears as in Figure 1 with the work piece occupying the span within the nest 25. It is noted in the Figure 1 that the stripping actuating means in the form of the resilient slab 29 is fully expanded and the punches 31 extend from the bed plate 28 through the base plate 26, through the cork slab 29, into the stripper plate 22 and substantially flush with the surface of the face of the stripper plate 22 that is positioned furthermost from the bed plate 28.

Piercing or forming of the work piece is brought about by applying a pressure P, as indicated in the Figures 1, 2 and 3 by a movable part of the punch press. The pressure P exerts force upon the combination of die 20, nest 25, and stripper plate 22, whereby the resilient slab 29 is compressed to a thinner dimension. Compressing the resilient slab 29 as described permits the combination of die 20 and stripper plate 22 with a work piece therebetween to move towards the axially immovable punches 31. Being of an axially immovable nature, the punches 31 pass through the work piece and into the openings 21 of the die 20 as the resilient slab 29 is compressed. Holes are thus formed in the work piece by the punches.

Upon release of the pressure P, the resilient slab 29 is capable of overcoming considerable resistance to return to its original form because of its elastic nature. The force thus exerted is employed to force the combination of die 20 and stripper plate 22 with the work piece 5 therebetween away from the punches 31 and strip the work piece 5 off the punches. The finished work piece 5 may then be removed from the nest 25 by removing the die 20 from its working position and lifting the work piece out. The cycle can then be repeated.

With reference to Figure 2 of the drawing, I illustrate an alternative stripping actuating means to serve in place of resilient slab 29. The reference character 37 indicates a set of strong springs which will move the combination of die 20 and stripper plate 22 off the punches 31 as the pressure P is removed. All other operations are similar to those hereinbefore described.

A third type of stripper actuating means is illustrated in Figure 3 in which the reference character 48 indicates generally a fluid means, such as a hydraulic or pneumatic system, disposed to return the combination of die 20 and stripper plate 22 to their original position as the pressure P is removed. I illustrate arms 40 connected to cross member 41 and contacting the surface of stripper plate 22. A piston rod 42 is disposed to operate a piston 43 within a compression chamber 44. The chamber 44 may be connected to a source of pressure through a connection 45.

In operation, the fluid stripping actuating means 48 serves the same general purpose as the resilient slab 29 of Figure 1. A fluid pressure is exerted upon the piston 43 from a source of pressure brought in through the connection 45. The fluid pressure acting upon the area of the piston 43 exerts a force upon the piston rod 42, the cross member 41, the arms 40, the stripper plate 22, and the die 20. The force thus exerted by the fluid system holds the assembly in the position illustrated in Figure 3 of the drawing until a greater force P is exerted in the opposite direction, as from a press.

Exertion of a force P great enough to overcome the force exerted by the hydraulic means 48 will move the combination of die 20 and stripper 22 upon the punches 31. As the force P is removed, the force of the fluid means 48 returns the die and stripper to their original position.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A die assembly for use in a press, comprising dies to hold a work piece therebetween, each of the said dies having at least an opening therethrough with corresponding openings of each die being in substantial alignment with one another, a base plate and punch means having means therebetween to oppose axial movement of the punch means in the direction of its longitudinal axis, said means providing lateral clearance therebetween to permit a degree of movement in a direction transversely of the longitudinal axis of the punch means to provide free alignment of the punch means with the openings of the said dies, one of the said dies serving as a punch guide and the other of said dies providing shearing surfaces in combination with the punch means, the said dies being disposed to reciprocally move as a unit upon the punch means under the action of the said press.

2. A die assembly for use in a press, comprising dies to hold a work piece therebetween, each of the said dies having at least an opening therethrough with corresponding openings of each die being in substantial alignment with one another, a base plate and punch means having means therebetween to oppose axial movement of the punch means in the direction of its longitudinal axis, said means providing lateral clearance therebetween to permit a degree of movement in a direction transversely of the longitudinal axis of the punch means to provide free alignment of the punch means with the openings of the said dies, stripping actuating means, one of the said dies serving as a punch guide and the other of said dies providing shearing surfaces in combination with the punch means, the said dies being disposed to reciprocally move as a unit upon the punch means under the action of the said press and the said stripping actuating means, the stripping actuating means being composed of resilient elements disposed to urge the dies away from the said base plate and punch means as the influence of the press is removed.

3. A die assembly for use in a press, comprising dies to hold a work piece therebetween, each of the said dies having at least an opening therethrough with corresponding openings of each die being in substantial alignment with one another, a base plate and punch means having means therebetween to oppose axial movement of the punch means in the direction of its longitudinal axis, said means providing lateral clearance therebetween to permit a degree of movement in a direction transversely of the longitudinal axis of the punch means to provide free alignment of the punch means with the openings of the said dies, stripping actuating means, one of the said dies serving as a punch guide and the other of said dies providing shearing surfaces in combination with the punch means, the said dies being disposed to reciprocally move as a unit upon the punch means under the action of the said press and the said stripping actuating means, the stripping actuating means being composed of a fluid system disposed to urge the dies away from the said base plate and punch means as the influence of the press is removed.

4. A piercing die assembly for use in a press, comprising dies to hold a work piece therebetween, at least one of the said dies being removable to permit accessibility for inserting and removing a work piece from its position therebetween, each of the said dies having at least an opening therethrough with corresponding openings of each die being in substantial alignment with one another, punch means, means to oppose the movement of the punch means in the direction of its longitudinal axis but having a degree of freedom for lateral movement, the said dies being disposed to reciprocally move upon the punch means under the action of the said press.

5. A stamping die assembly disposed to be operated by actuating means, said stamping die assembly comprising a die member, a stripping member, stripping actuating means, and a base plate and punch means, the said die member having at least an opening therein, the said stripping member having at least an opening therein in substantial alignment with the opening in the die member, the said punch means having interlocking surfaces with the said base plate to oppose movement in the direction of its longitudinal axis of the punch means in the direction of its longitudinal axis, and the punch means having a stem portion extending axially away from the said base plate, the said die member being removably connected to the stripping member whereby a work piece may be inserted between the die member and the stripping member, the combination of die member and stripping member being actuated toward the base plate by the actuating means with the aligned openings of the die member and stripping member admitting the punch means therethrough and with the stripping member serving to guide the punch means into the said one or more openings of the die member, the said stripping actuating means returning the die member and stripping member to their original position as the actuating means returns to its original position, the stripping member thereby serving to strip the work piece from the punch means.

6. A stamping assembly comprising a stripper part, a die part, a base part, at least a punch, elastic compressible separating means, and work positioning means, the said stripper part having openings therethrough shaped to admit the said at least a punch with close tolerances therebetween, the said die part comprising a plate with openings therethrough shaped to provide shearing action between the die part and the said at least a punch, the said base part serving as a base for the stamping assembly and having openings therethrough shaped to provide a loose fit with the said punches, the said elastic compressible material being capable of overcoming considerable force to return to its original form, the said at least a punch being of any suitable cross-sectional form having parallel sides over part of the length thereof and having flared end parts to prevent pulling through the openings of the base part, the said openings of the parts of the stamping assembly being held in substantial alignment and the said at least a punch being disposed to extend upwardly through the base part, past the elastic compressible means, through the stripper part and into the die part when the assembly is subjected to enough pressure to compress the said elastic compressible means, the said work positioning means serving to hold a piece of work in its proper position between the said alignment means and the die part during a stamping operation.

7. A die assembly disposed to be operated by actuating means, comprising a base plate and punch means having engagement means to oppose movement of the punch means in a direction along the longitudinal axis thereof, dies to hold a work piece therebetween, each of said dies having at least an opening therethrough with corresponding openings of each die being in substantial alignment with one another, one of said dies comprising a guide for the punch means and the other of said dies providing a shearing surface in combination with the punch means, work positioning means between said dies, stripping actuating means, the said dies being removably connected together to permit accessibility for inserting and removing a work piece from its position therebetween, said dies being disposed to close upon said work piece and thereafter reciprocally move as a unit upon the punch means under the action of said actuating means and said stripping actuating means.

8. A die assembly disposed to be operated by an actuating means, comprising a base plate and punch means having engagement means to oppose movement of the punch means in a direction along the longitudinal axis thereof, but providing a degree of freedom for lateral movement therefor, a first and a second die to hold a work piece therebetween, said first die having an opening therethrough to serve as a guide for the punch means and the second die having an opening therethrough providing shearing surfaces in combination with the punch means, said punch means extending from the base plate and into the guide opening of the said first die, work positioning means between said first and second dies, said first and second dies being disposed to move as a unit, said actuating means moving said die unit with the work piece therebetween toward the base plate, whereby the punch penetrates the work piece and extends into the opening in the said second die, stripping actuating means to move the said die unit away from the said base plate and strip the work piece off the punch means.

9. A die assembly disposed to be operated by an actuating means, said die assembly comprising a base plate and processing punch means, a first and a second die functioning as a unit with one of said dies being removably connected to the other to permit a work piece to be inserted and held therebetween, engagement means to oppose movement of said processing punch means in a direction along the longitudinal axis thereof, but providing a degree of freedom for lateral movement therefor, said first die having an opening therethrough to serve as a guide for the processing punch means and the second die having processing surface means in combination with the said processing punch means, said processing punch means extending from the base plate and into the guide opening of the said first die, and stripping actuating means to urge said first die and said base plate from one another, said actuating means moving said die unit and said base plate toward each other against the urging force of said stripping actuating means, whereby the processing punch means is caused to process the work piece in combination with the said second die surface means.

10. A pair of dies to hold a work piece therebetween, one of said dies having an opening therethrough, the other of said dies having process punch surface means, processing punch means having a work end, said work end extending into the opening of said one of said dies, means to permit a degree of lateral movement of said punch means and oppose endwise movement, the said pair of dies being disposed to move as a unit upon the said punch means, whereby the punch means is caused to process the work piece in combination with the said die having processing punch surface means.

ALDRICH R. HEDBERG.